United States Patent
Garofalo

[11] Patent Number: 6,007,127
[45] Date of Patent: Dec. 28, 1999

[54] TAILGATE CARGO CONTAINER

[75] Inventor: Mary Ann Garofalo, 11200 Forrer Dr., Sterling Heights, Mich. 48312

[73] Assignee: Mary Ann Garofalo, Sterling Heights, Mich.

[21] Appl. No.: 08/950,026

[22] Filed: Oct. 14, 1997

[51] Int. Cl.$^6$ ..................................................... B62D 33/02
[52] U.S. Cl. ..................................... 296/26.11; 296/57.1
[58] Field of Search ................................ 296/57.1, 26.08, 296/26.11, 26.04, 26.06, 26.02; 224/402, 403, 497, 498, 499

[56] References Cited

U.S. PATENT DOCUMENTS

| | | | |
|---|---|---|---|
| 4,472,639 | 9/1984 | Bianchi | 296/26.11 |
| 4,531,773 | 7/1985 | Smith | 296/26 |
| 4,580,828 | 4/1986 | Jones | 296/57 |
| 4,778,213 | 10/1988 | Palmer | 296/26 |
| 4,889,378 | 12/1989 | Sims | 296/57.1 |
| 5,320,397 | 6/1994 | Peterson | 296/57.1 |
| 5,340,184 | 8/1994 | Conrado | 296/50 |
| 5,468,038 | 11/1995 | Sauri | 296/26.11 X |
| 5,533,771 | 7/1996 | Taylor | 296/26 |
| 5,752,800 | 5/1998 | Brincks et al. | 296/57.1 X |

Primary Examiner—Joseph D. Pape

[57] ABSTRACT

The present invention relates to a tailgate cargo container (10) having a left panel (12L) which has at least one left panel hinge (12LA) which is positioned at a bottom end thereof and connected to a left side of a vehicle tailgate (14A). The left panel (12L) further has at least one left panel hinge cut out (12LC) positioned at a rear edge thereof. A right panel (12R) which has at least one right panel hinge (12RA) positioned at a bottom end thereof is connected to a right side of the vehicle tailgate (14A). The right panel (12R) further has at least one right panel hinge cut out (12RC) positioned at a rear edge thereof. A middle panel (12C) which has at least one middle panel left hinge (12CAL) positioned at a left side of a bottom end thereof and connected to a left rear side of the vehicle tailgate (14A). The at least one left panel hinge cut out (12LC) is complimentarily positioned over the at least one middle panel left hinge (12CAL) when the left panel (12L) is folded inward. The middle panel (12C) further has at least one middle panel right hinge (12CAR) positioned at a right side of a bottom end thereof and connected to a right rear side of the vehicle tailgate (14A). The at least one right panel hinge cut out (12RC) is complimentarly positioned over the at least one middle panel right hinge (12CAR) when the right panel (12R) is folded inward. The middle panel (12C) further has at least one middle panel center hinge (12CAC) positioned along a middle bottom end thereof and connected to a middle rear side of the vehicle tailgate (14A). The middle panel (12C) further has an inwardly facing middle panel skirt (12CB) positioned along a left side and a right side and a top side. The middle panel skirt (12CB) has a width slightly larger than a width of the left panel (12L) or right panel (12R) functioning to prevent debris from accumulating between the panels (12L, 12R, 12C). Finally, a latching arrangement secures the left panel (12L) and right panel (12R) to the middle panel (12C).

4 Claims, 4 Drawing Sheets

TAILGATE CARGO CONTAINER

BACKGROUND OF THE INVENTION

1. Field of the Invention

The present invention relates to vehicle attachment equipment. More particularly, the present invention relates to truck tailgate extension devices.

2. Description of the Prior Art

Pickup trucks have a bed of limited length for carrying cargo. While most of the time the bed length is sufficient, often items are carried that extend beyond the limits of the pickup truck bed. The tail gate on a pickup truck is designed to fold down permitting long items to be placed on the floor of the bed, but, extending beyond the rearward limits of the bed. These loads must be secured to prevent them from falling out the back of the truck. Often with the long loads various smaller items must be carried. When the tailgate is folded down, there is nothing to keep the smaller items from falling out, short of individually securing each one. What is desired is a pickup truck bed extender that permits long items to be carried flat on the bed and constrains smaller items within the pickup truck bed. Further, the extension needs to retract for storage.

Numerous innovations for Tailgate Cargo Containers have been provided in the prior art that are described as follows. Even though these innovations may be suitable for the specific individual purposes to which they address, they differ from the present invention as hereinafter contrasted.

In U.S. Pat. No. 5,533,771, invented by Taylor, et. al., titled a Multiple Purpose Truck Tailgate Apparatus, a multiple purpose truck tailgate apparatus for a pickup truck of the type having a bed and a tailgate pivotally mounted to the bed is described. The apparatus comprises a first panel member and a structure for mounting the first panel member in a sliding manner to the bed of the truck. When the tailgate is opened, the first panel member can be extended therefrom. A second panel member is provided. A facility is for coupling the second panel member against a free end of the first panel member. A third panel member is provided. A facility is for coupling the third panel member against a free end of the second panel member. An assembly is for pivoting the first panel member on the sliding mounting structure. The first panel member with the second panel member and the third panel member can be positioned at various angles at the opened tailgate, to be used for different tasks.

The present invention differs from the patented invention because the patented invention is slidably attached to the truck bed. Multiple elements infold to form a platform Support posts are provided at the end of the platform. The platform can be angled to form a down ramp or an up ramp. The end section is pivotable so that when the platform is vertical the end may be rotated to form a elevated horizontal platform.

In U.S. Pat. No. 5,340,184, invented by Conrado, titled Aerodynamically Improved Tailgate Construction for Pickup Truck, a pickup truck tailgate construction is described which enables the tailgate to be used either (1) in a customary manner, with the bottom of the tailgate in hinged relation with the after end of the bed so that the tailgate can be pivoted between vertical closed position and horizontal open position or (2) in a modified fashion, in which the top of the tailgate is pivotally arranged so that the bottom of the tailgate can be positioned several inches rearwardly from the after end of the bed. The rectangular gap between the bottom of the tailgate and the adjacent after end of the bed and the triangular gaps between the opposite ends of the tailgate and the adjacent after ends of the side walls are spanned by correspondingly shaped mesh panels which allow free flow of air therethrough. Improved fuel efficiency and handling of the vehicle results from the aerodynamically enhanced construction.

The patented invention differs from the present invention because the patented invention is a aerodynamic device to improve air flow and reduce drag of the tailgate assembly. The present invention functions to restrain cargo which is longer than the bed of the truck. The present invention folds flat on the tailage when not in use.

In U.S. Pat. No. 4,889,378, invented by Sims, titled a Pickup Truck Tailgate Accessory an accessory for attachment to the tailgate of a pickup truck comprising a panel member of about the same width as the tailgate, and of a height at least about half that of the tailgate, a pair of hinge brackets secured to the tailgate near the sides thereof bracket secured to the panel member and including a hinge pin secured to the bracket and extending into an aperture in the hinge bracket, a pair of latch apertures in the hinge bracket, a latch bracket secured to the bracket, and a latch pin laterally movable in the latch bracket between a latching position wherein the latch pin extends into one of the latch apertures and a release position wherein the latch pin is retracted from the latch aperture, whereby in the release position, the panel member may pivot about the hinge pins between a first position parallel to the tailgate and a second position substantially perpendicular to the tailgate, so that the accessory serves as an extended stop for long lengths of cargo or as a protector for the top of the tailgate according to the desired arrangement of the accessory.

The patented invention differs from the present invention because the patented invention is an extended stop for long lengths of cargo. The patented invention is attached with hinges that have a stop. The patented invention can be positioned in one of several position by hinging the device then inserting a pin. The present invention is attached to a standard truck tailgate connected to a truck body by a hinge on one edge. An additional hinge along an opposite edge of the tailgate connects the tailgate to a first tailgate extension. The tailgate extension has hinged flaps attached to opposite sides. In operation the tailgate opened and folded flat. The first tailgate extension is unfolded to a vertical position and the flaps unfolded in a forward direction. The flaps are removably attached to the tailgate along a common edge. The removable fastenings may be trunnions, hooks & eyes, hook & loop, or straps.

In U.S. Pat. No. 4,778,213, invented by Palmer, titled an Extendable Vehicle Tailgate Assembly, an extension for a truck or other vehicle having a tailgate, with the extension including two side panels to be attached to the main tailgate of the vehicle in positions parallel to one another and for swinging movement with the main tailgate between its open and closed positions, an auxiliary tailgate which projects upwardly from a rear edge of the main tailgate in the open position of the main tailgate, and hinge structure mounting the auxiliary tailgate for swinging movement relative to the main tailgate and relative to the side panels, while the side panels remain generally parallel to one another, and from an active position of the auxiliary tailgate essentially perpendicular to the main tailgate to a retracted position essentially parallel to and essentially adjacent the main tailgate.

The patented invention differs from the present invention because the patented invention is pickup truck bed extender Which is hingably attached to the upper edge of a tailgate.

A pair of side supports are attached to the surface of the tailgate so that when in use they extend the side of the truck body. A pair of extended tailgate supports are fastened to the side supports and to the extended tailgate portion. The present invention is attached to a standard truck tailgate connected to a truck body by a hinge on one edge. An additional hinge along an opposite edge of the tailgate connects the tailgate to a first tailgate extension. The tailgate extension has hinged flaps attached to opposite sides. In operation the tailgate opened and folded flat. The first tailgate extension is unfolded to a vertical position and the flaps unfolded in a forward direction. The flaps are removably attached to the tailgate along a common edge. The removable fastenings may be trunnions, hooks & eyes, hook & loop, or straps. The patented invention lacks the folding side supports. Further when the tailgate is in the vertical position the side supports obstruct the cargo area.

In U.S. Pat. No. 4,580,828, invented by Jones, titled Tailgate for a Pickup Truck, an improved tailgate apparatus is provided for use on the rear of the cargo compartment of pickup trucks. The apparatus is comprised of a tailgate panel which attaches to the cargo compartment with the aid of paired flat arms, and storage compartment located beneath the floor of the cargo compartment. In use, the tailgate panel can be positioned in either a closed position, a first open position where it extends rearwardly from the cargo compartment or a second open position where it is housed within said storage compartment.

The patented invention differs from the present invention because the patented invention is a tailgate that retracts into a compartment when it is horizontal. The patented invention does not have features similar to the present invention.

In U.S. Pat. No. 4,531,773, invented by Smith, titled a Vehicle Tailgate Extension Assembly, the assembly of the present invention comprises a foldable container slidably connected to a pair of slide guides adapted to be secured to opposite sides of a vehicle tailgate. The container in one operative position has an open top and front and closed bottom, rear and sides. The container comprises a bottom bed panel, a rear panel hinged thereto and moveable between a stacked position over the bed panel, a vertical operative position and a hangtail operative position hanging below and behind the bed panel. A pair of side panels are hinged to opposite sides of the rear panel and are moveable between a stored position overlying the rear panel and an operative position perpendicular thereto and forwardly thereof. Catches releasably latch the side panels to the rear panel and, in the operative position, to a vehicle frame, and similar catches releasably latch the bed panel and thus the container to the slide guides. The container may slide between a forward stored position and a rear operative position. Telescoping slide guides and/or bed and side panels may be provided to facilitate rearward extension of the container. The assembly is simple, inexpensive, easy to install, store and remove, and effectively increases the carrying capacity of an open bed truck, station wagon, etc.

The patented invention differs from the present invention because the patented invention is attached to the tailgate by a pair of guides which retain the edges of the patented invention. When unfolded the patented invention is similar to the present invention. The present invention however, is attached to the upper portion of the tail gate by a hinge.

Numerous innovations for Tailgate Cargo Container have been provided in the prior art that are adapted to be used. Even though these innovations may be suitable for the specific individual purposes to which they address, they would not be suitable for the purposes of the present invention as heretofore described.

SUMMARY OF THE INVENTION

The present invention is a tailgate extension for a standard pickup truck tailgate. It functions to extend the truck bed and prevent cargo from falling out the other wise open back of the pickup truck bed. The present invention is a panel essentially the same width as the tailgate which is attached to a pickup truck tailgate by a hinge joint. When the present invention is in an operational position one flap is unfolded rearwardly and two side flaps unfold to the sides and are removably attached to the pickup truck bed preventing small items from falling out through the gap.

The types of problems encountered in the prior art are pickup truck cargo beds are of limited length and are often used for longer loads. Further, often a user desires to carry both long and short loads at the same time. While the tailgate may be dropped for long loads, when short loads are mixed in the cargo bed no restraint is provided. Consequently the short loads can fall out the back.

In the prior art, unsuccessful attempts to solve this problem were attempted namely: bed and tailgate extensions for long loads which did not address the short load condition. However, the problem was solved by the present invention because side panels are provided which prevent small items from falling out through the gap between the sides of the truck bed and the vertical portion of the present invention.

The present invention solved a long felt need for a pickup truck bed extension which confines long items within the cargo bed.

Accordingly, it is an object of the present invention to provide an improved tailgate accessory which increases the versatility of the truck bed.

More particularly, it is an object of the present invention to provide a tailgate accessory which extends the useable length of the truck bed.

In keeping with these objects, and with others which will become apparent hereinafter, one feature of the present invention resides, briefly stated, in a hinge attachment securing the present invention to a tailgate.

When the tailgate cargo extender is designed in accordance with the present invention, long cargos can be accommodated inside the truck bed and long and short cargos can be mixed with both being confined within the truck bed.

In accordance with another feature of the present invention, side panels prevent small items from falling out the gap between the truck sides and the panel of the present invention.

Another feature of the present invention is that a tailgate accessory is provided which secured in an out of the way position when not in use.

Yet another feature of the present invention is that a tailgate accessory is provided which is easily collapsed when not in use.

Still another feature of the present invention is that is that a tailgate accessory is provided which is secured in a unobtrusive position when not in use.

Still another feature of the present invention that airflow is improved in the rear portion of the vehicle reducing the aerodynamic drag of the tailgate assembly resulting in improved fuel economy.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

DESCRIPTION OF THE PREFERRED EMBODIMENT

Figure 1:
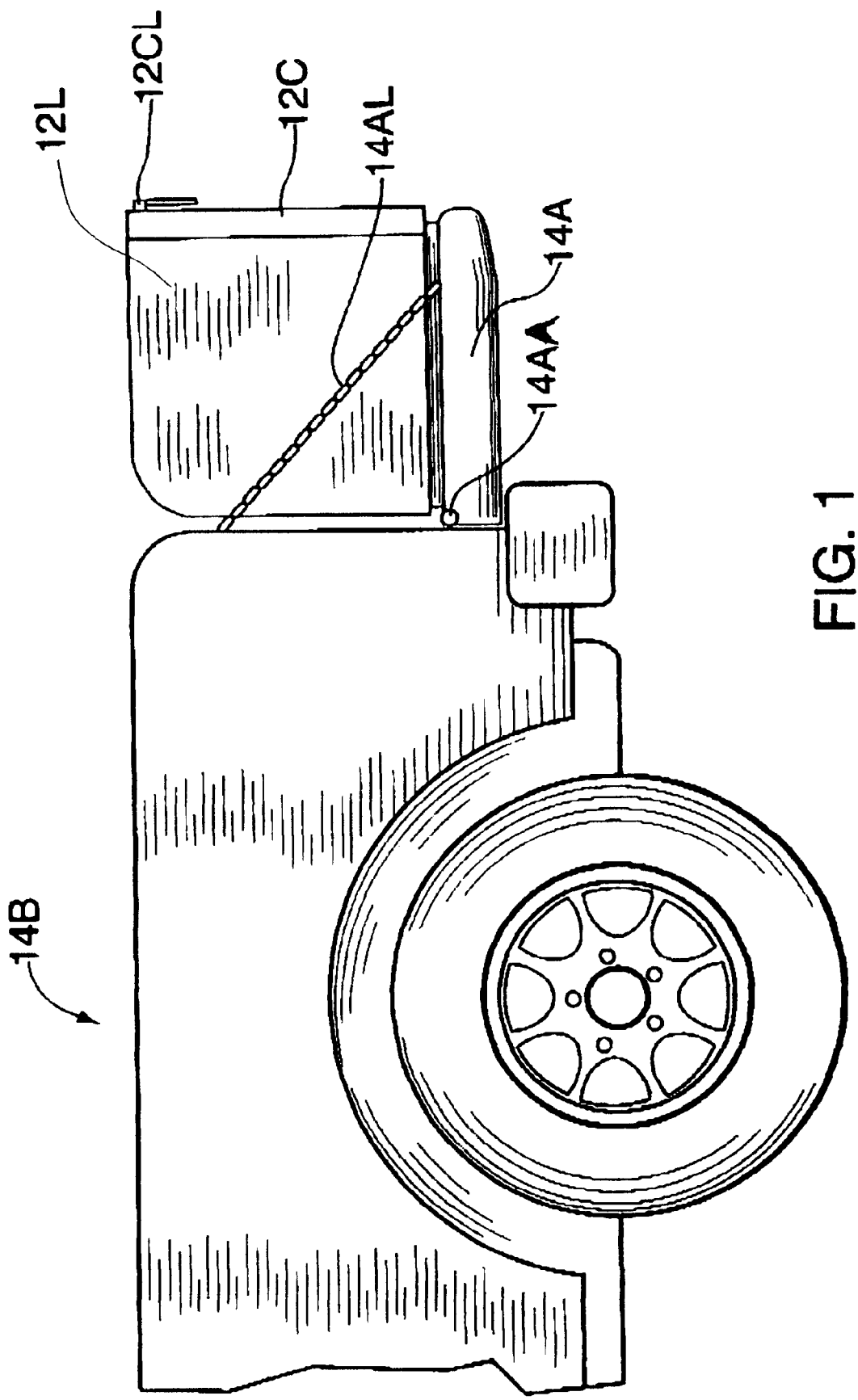
FIG. 1 is a left side view of a tailgate cargo container attached to a vehicle tailgate which is hinged to a vehicle bed.

Firstly, referring to FIG. 1 which is a left side view of a tailgate cargo container (10) attached to a vehicle tailgate (14A). The vehicle tailgate (14A) is attached to a vehicle bed (14B) by a vehicle tailgate hinge (14AA). The vehicle tailgate (14A) functions to rotate from a vertical position to a horizontal position. The vehicle tailgate (14A) may be supported in the horizontal position by a vehicle tailgate left safety (14AL) which is attached at one distal end to the vehicle bed (14B) and at the opposite distal end to the vehicle tailgate (14A). The tailgate cargo container (10) still further comprises a middle panel (12C). The middle panel (12C) is hingably attached to a upper edge of the vehicle tailgate (14A). The middle panel (12C) functions to rotate from a stowed horizontal position to a vertical operable position.

The vehicle tailgate (14A) is hingably attached on one distal end to one edge of a left panel (12L). A latching means functions to secure the left panel (12L) to the middle panel (12C) when the middle panel (12C) is in an operable position. The latching means comprises a middle panel left latch (12CL) rotatably mounted on a left side of the middle panel (12C).

The tailgate cargo container (10) is manufactured from a material selected from a group consisting of wood, wood composite, metal, metal alloy, plastic, plastic composite, epoxy, fiberglass, and carbon-graphite.

Figure 2:
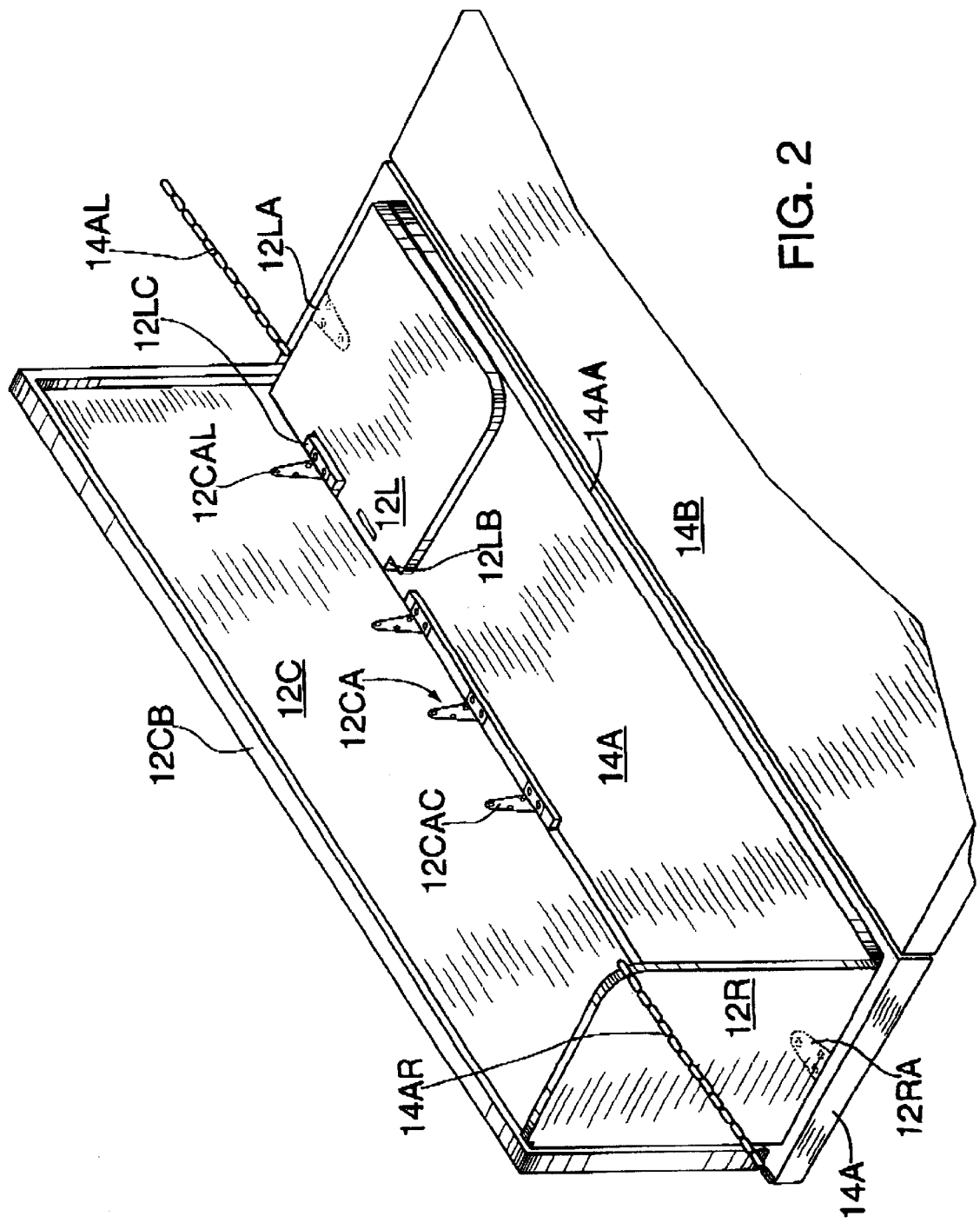
FIG. 2 is a top right side view of a tailgate cargo container attached to a vehicle tailgate which is hinged to a vehicle bed exhibiting a left panel in a folded down position.

Referring to FIG. 2 which is a top right side view of a tailgate cargo container (10) attached to a vehicle tailgate (14A) which is hinged to a vehicle bed (14B) exhibiting a left panel (12L) in a folded down position and a right panel (12R) in a folded up position. The vehicle tailgate (14A) may comprise a vehicle tailgate left safety (14AL) and a vehicle tailgate right safety (14AR) attached to the vehicle bed (14B) functioning to further support the weight of the tailgate cargo container (10). The middle panel (12C) comprises at least one middle panel hinge (12CA) which may be a piano hinge extending the full length thereof.

The left panel (12L) comprises at least one left panel hinge (12LA) positioned at a bottom end thereof and connected to a left side of a vehicle tailgate (14A). The left panel (12L) further comprises at least one left panel hinge cut out (12LC) positioned at a rear edge thereof. The left panel (12L) further comprises a left panel skirt cut out (12LB) positioned at a top rear corner. The left panel skirt cut out (12LB) comprises a complimentary configuration to a top of the middle panel skirt (12CB).

The right panel (12R) comprises at least one right panel hinge (12RA) positioned at a bottom end thereof and connected to a right side of the vehicle tailgate (14A). The right panel (12R) further comprises at least one right panel hinge cut out (12RC) positioned at a rear edge thereof. The right panel (12R) further comprises a right panel skirt cut out (12RB) positioned at a top rear corner. The right panel skirt cut out (12RB) comprises a complimentary configuration to a top of the middle panel skirt (12CB).

The middle panel (12C) comprises at least one middle panel left hinge (12CAL) positioned at a left side of a bottom end thereof and connected to a left rear side of the vehicle tailgate (14A). The at least one left panel hinge cut out (12LC) is complimentary positioned over the at least one middle panel left hinge (12CAL) when the left panel (12L) is folded inward.

The middle panel (12C) further comprises at least one middle panel center hinge (12CAC) positioned along a middle bottom end thereof and connected to a middle rear side of the vehicle tailgate (14A). The middle panel (12C) further comprises an inwardly facing middle panel skirt (12CB) positioned along a left side and a right side and a top site. The middle panel skirt (12CB) comprises a width slightly larger than a width of the left panel (12L) or right panel (12R) functioning to prevent debris from accumulating between the panels (12L, 12R, 12C).

The left panel skirt cut out (12LB) function to allow flush configuration of the top of left panel (12L) with the top of the middle panel (12C) when the tailgate cargo container (10) is in an extended position.

A tailgate cargo container (10) further comprises a middle panel left latch (12CL) which functions to secure the left panel (12L) to the middle panel (12C). The middle panel left latch (12CL) rotatably mounted on a left side of the middle panel (12C). The middle panel left latch (12CL) engages a left panel slot (12LD) configured in a complimentary position in the left panel (12L).

Figure 3:
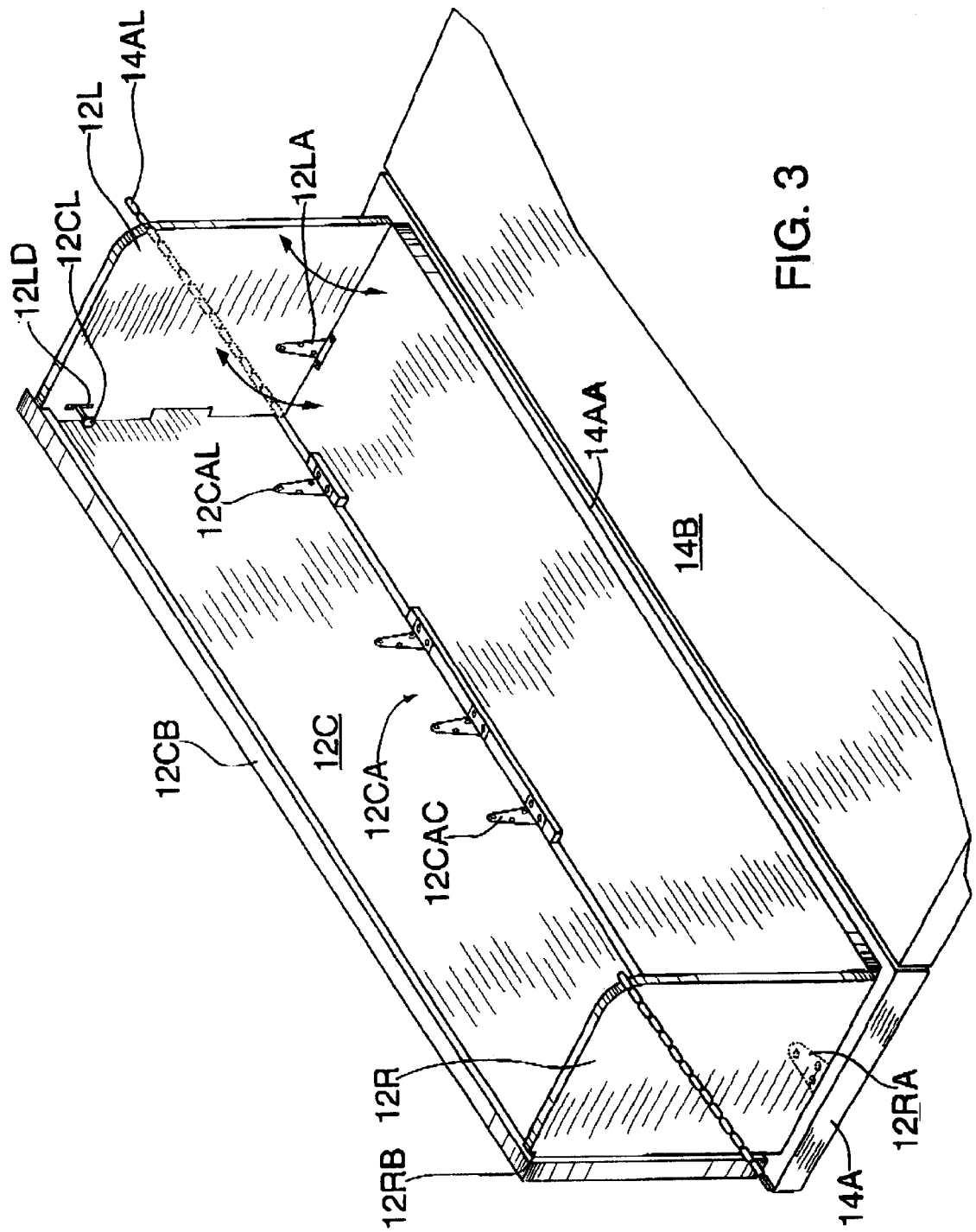
FIG. 3 is a top right side view of a tailgate cargo container attached to a vehicle tailgate which is hinged to a vehicle bed exhibiting all panels in an extended position.

Now, referring to FIG. 3 which is a top right side view of a tailgate cargo container (10) attached to the vehicle tailgate (14A), which is attached to the vehicle bed (14B) by a vehicle tailgate hinge (14AA), exhibiting all panels (12L, 12R, 12C) in an extended position.

The left panel (12L) comprises at least one left panel hinge (12LA) positioned at a bottom end thereof and connected to a left side of a vehicle tailgate (14A). The at least one left panel hinge (12LA) functions to permit rotating the left panel (12L) from a stowed horizontal position to a vertical operable position.

The right panel (12R) comprises at least one right panel hinge (12RA) positioned at a bottom end thereof and connected to a right side of the vehicle tailgate (14A). The at least one right panel hinge (12RA) functions to permit rotating the right panel (12R) from a stowed horizontal position to a vertical operable position.

The middle panel (12C) comprises at least one middle panel left hinge (12CAL) positioned at a left side of a bottom end thereof and connected to the left rear side of the vehicle tailgate (14A). The middle panel (12C) further comprises at least one middle panel right hinge (12CAR) positioned at a right side of a bottom end thereof and connected to the right rear side of the vehicle tailgate (14A). The middle panel (12C) further comprises at least one middle panel center hinge (12CAC) positioned along a middle bottom end thereof and connected to the middle rear side of the vehicle tailgate (14A). The middle panel (12C) further comprises the inwardly facing middle panel skirt (12CB) positioned along the left side and the right side and the top side. The middle panel skirt (12CB) comprises a width slightly larger than the width of the left panel (12L) or right panel (12R) functioning to prevent debris from accumulating between the panels (12L, 12R, 12C).

The left panel (12L) comprises a middle panel left latch (12CL) rotatably mounted on a left side of the middle panel (12C). The middle panel left latch (12CL) functions to secure the left panel (12L) to the middle panel (12C) when the left panel (12L) is folded upward to the operable position. The middle panel left latch (12CL) engages a left panel slot (12LD) configured in a complimentary position in the left panel (12L).

Figure 4:
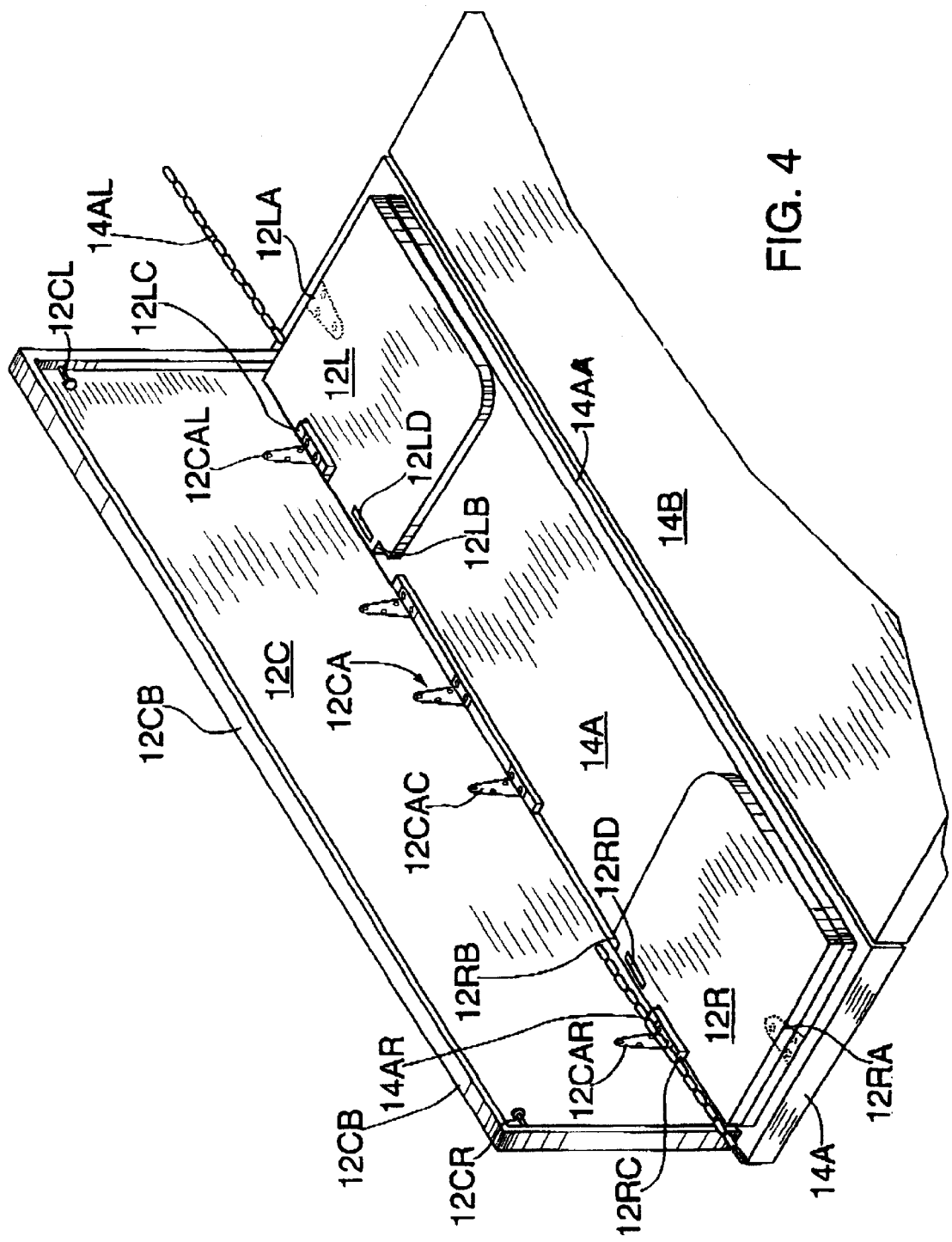
FIG. 4 is a top right side view of a tailgate cargo container attached to a vehicle tailgate which is hinged to a vehicle bed exhibiting a left panel and the left panel in a folded down position.

Lastly, referring to FIG. 4 is a top right side view of a tailgate cargo container (10) attached to the vehicle tailgate (14A), which is attached to the vehicle bed (14B) by a vehicle tailgate hinge (14AA), exhibiting the left panel (12L) and the right panel (12R) in a folded down position.

The left panel (12L) comprises the at least one left panel hinge (12LA) positioned at a bottom end thereof and connected to the left side of a vehicle tailgate (14A). The left panel (12L) further comprises the at least one left panel hinge cut out (12LC) positioned at a rear edge thereof. The left panel (12L) further comprises the left panel skirt cut out (12LB) positioned at the top rear corner. The left panel skirt cut out (12LB) comprises a complimentary configuration to the top of the middle panel skirt (12CB).

The right panel (12R) comprises the at least one right panel hinge (12RA) positioned at a bottom end thereof and connected to the right side of the vehicle tailgate (14A). The right panel (12R) further comprises the at least one right panel hinge cut out (12RC) positioned at a rear edge thereof. The right panel (12R) further comprises a right panel skirt cut out (12RB) positioned at a top rear corner. The right panel skirt cut out (12RB) comprises a complimentary configuration to a top of the middle panel skirt (12CB).

The middle panel (12C) which comprises at least one middle panel left hinge (12CAL) positioned at the left side of a bottom end thereof and connected to the left rear side of the vehicle tailgate (14A). The at least one left panel hinge cut out (12LC) is complimentary positioned over the at least one middle panel left hinge (12CAL) when the left panel (12L) is folded inward. The middle panel (12C) further comprises at least one middle panel right hinge (12CAR) positioned at the right side of a bottom end thereof and connected to the right rear side of the vehicle tailgate (14A). The at least one right panel hinge cut out (12RC) is complimentary positioned over the at least one middle panel right hinge (12CAR) when the right panel (12R) is folded inward. The middle panel (12C) further comprises the at least one middle panel center hinge (12CAC) positioned along a middle bottom end thereof and connected to a middle rear side of the vehicle tailgate (14A). The middle panel (12C) further comprises an inwardly facing middle panel skirt (12CB) positioned along a left side and a right side and a top side. The middle panel skirt (12CB) comprises a width slightly larger than a width of the left panel (12L) or right panel (12R) functioning to prevent debris from accumulating between the panels (12L, 12R, 12C).

The right panel skirt cut out (12RB) and the left panel skirt cut out (12LB) function to allow flush configuration of the top of the right panel (12R) and left panel (12L) with the top of the middle panel (12C) when the tailgate cargo container (10) is in an extended position.

The tailgate cargo container (10) further comprises a latching means to secure the left panel (12L) and right panel (12R) to the middle panel (12C). The latching means comprises the middle panel left latch (12CL) which is rotatably mounted on a left side of the middle panel (12C). The middle panel left latch (12CL) engages the left panel slot (12LD) which is configured in a complimentary position in the left panel (12L). The latching means further comprises a middle panel right latch (12CR) which is rotatably mounted on a right side of the middle panel (12C). The middle panel right latch (12CR) engages a right panel slot (12RD) configured in a complimentary position in the right panel (12R).

It will be understood that each of the elements described above, or two or more together, may also find a useful application in other types of constructions differing from the type described above.

While the invention has been illustrated and described as embodied in a tailgate cargo container, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A tailgate cargo container (10) comprising:
   A) a left panel (12L) which comprises at least one left panel hinge (12LA) positioned at a bottom end thereof and connected to a left side of a vehicle tailgate (14A), the left panel (12L) further comprises at least one left panel hinge cut out (12LC) positioned at a rear edge thereof;
   B) a right panel (12R) which comprises at least one right panel hinge (12RA) positioned at a bottom end thereof and connected to a right side of the vehicle tailgate (14A), the right panel (12R) further comprises at least one right panel hinge cut out (12RC) positioned at a rear edge thereof;
   C) a middle panel (12C) which comprises at least one middle panel left hinge (12CAL) positioned at a left side of a bottom end thereof and connected to a left rear side of the vehicle tailgate (14A), the at least one left panel hinge cut out (12LC) is complimentary positioned over the at least one middle panel left hinge (12CAL) when the left panel (12L) is folded inward, the middle panel (12C) further comprises at least one middle panel right hinge (12CAR) positioned at a right side of a bottom end thereof and connected to a right rear side of the vehicle tailgate (14A), the at least one right panel hinge cut out (12RC) is complimentary positioned over the at least one middle panel right hinge (12CAR) when the right panel (12R) is folded inward, the middle panel (12C) further comprises at least one middle panel center hinge (12CAC) positioned along a middle bottom end thereof and connected to a middle rear side of the vehicle tailgate (14A), the middle panel (12C) further comprises an inwardly facing middle panel skirt (12CB) positioned along a left side and a right side and a top side, the middle panel skirt (12CB) comprises a width slightly larger than a width of the left panel (12L) or right panel (12R) functioning to prevent debris from accumulating between the panels (12L, 12R, 12C); and D) a latching means to secure the left panel (12L) and right panel (12R) to the middle panel (12C).

2. The tailgate cargo container (10) as described in claim 1, wherein the latching means comprises a middle panel left latch (12CL) rotatably mounted on a left side of the middle panel (12C), the middle panel left latch (12CL) engages a left panel slot (12LD) configured in a complimentary position in the left panel (12L), the latching means further comprises a middle panel right latch (12CR) rotatably mounted on a right side of the middle panel (12C), the middle panel right latch (12CR) engages a right panel slot (12RD) configured in a complimentary position in the right panel (12R).

3. The tailgate cargo container (10) as described in claim 1, wherein the right panel (12R) further comprises a right panel skirt cut out (12RB) positioned at a top rear corner, the right panel skirt cut out (12RB) comprises a complimentary configuration to a top of the middle panel skirt (12CB), the left panel (12L) further comprises a left panel skirt cut out (12LB) positioned at a top rear corner, the left panel skirt cut out (12LB) comprises a complimentary configuration to a top of the middle panel skirt (12CB), the right panel skirt cut out (12RB) and the left panel skirt cut out (12LB) function to allow flush configuration of the top of the right panel (12R) and left panel (12L) with the top of the middle panel (12C) when the tailgate cargo container (10) is in an extended position.

4. The tailgate cargo container (10) as described in claim 1 is manufactured from a material selected from a group consisting of wood, wood composite, metal, metal alloy, plastic, plastic composite, epoxy, fiberglass, and carbon-graphite.

* * * * *